United States Patent [19]

Namba et al.

[11] 4,438,742
[45] Mar. 27, 1984

[54] INTERNAL COMBUSTION ENGINE

[75] Inventors: Yuzuru Namba; Kenichi Aoyagi, both of Hamamatsu, Japan

[73] Assignee: Suzuki Jidosha Kogyo Kabushiki Kaisha, Shizuoka, Japan

[21] Appl. No.: 296,854

[22] Filed: Aug. 27, 1981

[30] Foreign Application Priority Data

Sep. 29, 1980 [JP] Japan ............................. 55-135602
Sep. 29, 1980 [JP] Japan ............................. 55-135604

[51] Int. Cl.³ ...................... F02B 31/00; F02M 35/10
[52] U.S. Cl. .............................. 123/308; 123/188 M
[58] Field of Search ............. 123/308, 432, 188 M, 123/52 MB

[56] References Cited

U.S. PATENT DOCUMENTS 4,072,134 2/1978 Noguchi et al. .................... 123/432

FOREIGN PATENT DOCUMENTS 1077358 5/1980 Canada ............................. 123/308
54-103913 8/1979 Japan ............................... 123/308
55-93922 7/1980 Japan ............................ 123/188 M Primary Examiner—Craig R. Feinberg
Assistant Examiner—W. R. Wolfe
Attorney, Agent, or Firm—Quaintance & Murphy

[57] ABSTRACT

An internal combustion engine is described in which the shape and construction of the gas outlet end portion of a sub-suction path is made operative to inject a gas such as air, an air-fuel mixture or exhaust gas circumferentially into the combustion chamber during the suction stroke. The gas outlet end portion has a reduced diameter and an injection nozzle which has a length greater than its internal diameter. Moreover, the gas outlet end portion is constructed of a pipe member which is rotatably and adjustably fitted into the insertion hole of a cylinder head and which is so shaped that the open direction of the outlet end thereof can be changed when it is rotationally adjusted.

7 Claims, 10 Drawing Figures

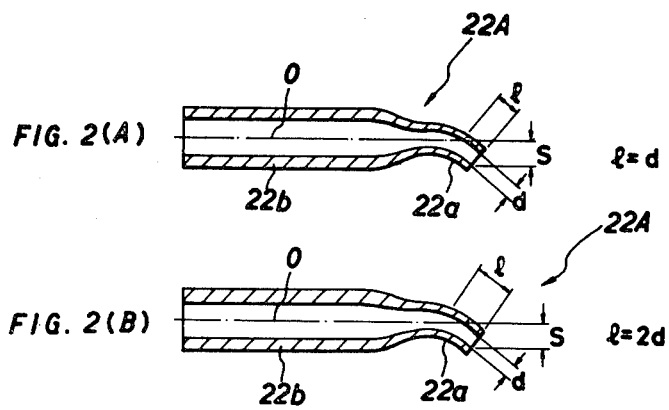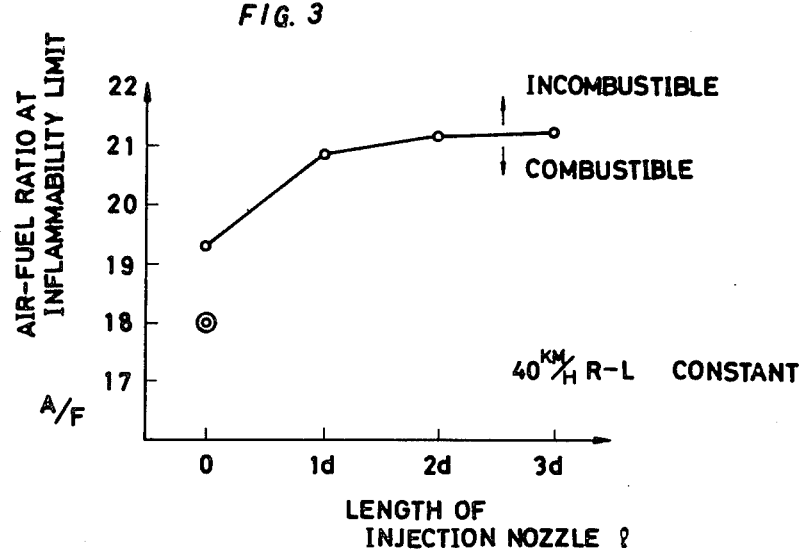

INTERNAL COMBUSTION ENGINE

BACKGROUND OF THE INVENTION

1. Field of the Invention

The present invention relates to an internal combustion engine with reduced noxious content in the exhaust gas. Nitrogen oxides ($NO_x$) are reduced and the rate of fuel consumption is improved.

2. Description of the Prior Art

Today internal combustion engines for automobiles are required not only to clean the exhaust gas but also to consume as little fuel as possible. For these requirements, an exhaust gas recirculation (EGR) system is provided and lean combustion is employed. In order to prevent combustion fluctuations and misfiring in such engines, it has been proposed to increase the burning velocity.

In order to increase this burning velocity, there have been recently proposed several intake systems, in which a sub-suction path is provided separately from the main suction path and is made to inject a gas into a combustion chamber to generate a swirl of the suction gas in the combustion chamber.

However, present engines having intake systems provided with a sub-suction path are still under development and are not presently satisfactory. In fact, the prior art internal combustion engines do not have a sufficiently intense swirl. This causes a limit on lean combustion, if exhaust gas recirculation is performed in preference to exhaust emission control, especially, for the reduction of the $NO_x$. In these prior examples, significant improvement in the rate of fuel consumption is not achieved.

On the other hand, in order to generate an intense swirl in the combustion chamber by the use of the sub-suction path, it is necessary to orient the direction of the outlet end of the sub-suction path. However, the construction of the outlet end of the sub-suction path in a predetermined direction is very difficult in production.

SUMMARY OF THE INVENTION

It is, therefore, an object of the present invention to provide an internal combustion engine, having a more intense swirl of suction gas than in prior engines. This is accomplished by devising the shape and construction of the gas outlet end of a sub-suction path thereby enhancing the inflammability limit of lean combustion.

Another object of the present invention is to provide an internal combustion engine, which has been conceived by elaborately investigating the influences of the shape and size of the downstream end of the sub-suction path upon the intensity of the swirl of the suction gas and in which that downstream end has a reduced diameter and is in the form of an injection nozzle such that the length of the injection nozzle portion, i.e., the reduced portion is made larger than the internal diameter of the injection nozzle thereby to reduce the fluid resistance of the whole sub-suction path and to increase the flow velocity of the gas to be injected from the sub-suction path, thereby increasing the swirl of the suction gas.

Still another object of the present invention is to provide an internal combustion engine, in which the outlet (i.e., downstream) end of the sub-suction path can be easily adjusted in a predetermined direction by constructing the gas outlet end of the sub-suction path such that it is made of a pipe member which is rotatably and adjustably press-fitted in an insertion hole formed in a cylinder head. Furthermore, the open direction of the downstream end can be changed when it is rotationally adjusted.

BRIEF DESCRIPTION OF THE DRAWINGS

FIGS. 2(A) and 2(B) are sectional views showing the shapes of pipe members constituting the outlet end of a sub-suction path; and FIG. 3 is a graphical presentation illustrating the effect of the present invention.

DESCRIPTION OF THE PREFERRED EMBODIMENTS

Figure 1:
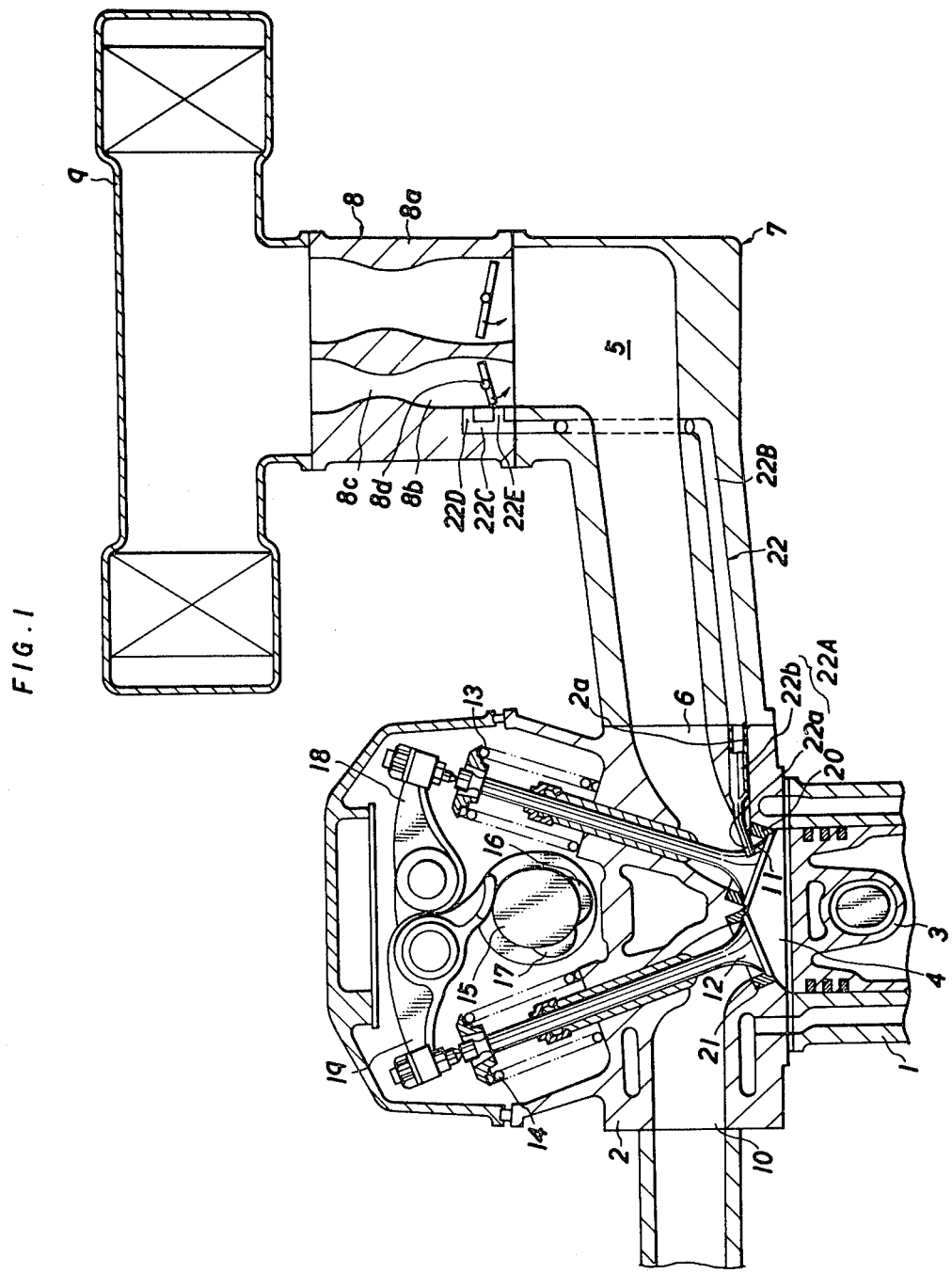
FIG. 1 is a sectional view showing one embodiment of the present invention.

The present invention will now be described in connection with the embodiments thereof shown in the accompanying drawings. In FIG. 1, reference numerals 1, 2 and 3 indicate a cylinder, a cylinder head and a piston, respectively. Numeral 4 indicates a combustion chamber into which a main suction path 5 is opened. This main suction path 5 is constructed into a serial passage which leads from a suction port 6 formed in the cylinder head 2 via a suction manifold 7 and a two-barrel carburetor 8 acting as a fuel supply device which receives air through an air cleaner 9.

The suction port 6 is so directed as to generate a swirl turning within the combustion chamber 4 centering around the axis of the cylinder 1. The swirling direction is such that the air-fuel mixture supplied from said suction port 6 will flow into an exhaust port 10 after it has passed an ignition plug 28 (See FIG. 4). Moreover, the two ports 6 and 10 are opened or closed by the actions of a suction valve 11 and an exhaust valve 12, respectively. Both valves 11 and 12 are opened or closed by the action of an opening control mechanism, which is constructed of return springs 13 and 14, cams 16 and 17 driven by a cam shaft 15, and rocker arms 18 and 19. In this manner, the valves 11 and 12 are seated upon their respective valve seats 20 and 21 when they are closed.

Reference numeral 22 indicates a sub-suction path which has a smaller effective opening area than that of the main suction path 5. The sub-suction path 22 comprises a pipe member 22A which is embedded in the cylinder head 2 to form the outlet end portion thereof; a passage portion 22B which is formed in the suction manifold 7; a passage portion 22C which is formed in the body 8a of the carburetor 8; and two inlet ends 22D and 22E which are branched from the passage portion 22C and which respectively open into the primary draft passage 8b of the carburetor 8. Both inlet ends 22D and 22E are spaced in the flow direction of the draft passage 8b. Specifically, the upstream side inlet end 22D is always opened between the primary venturi portion 8c and the primary throttle valve 8d of the carburetor 8 whereas the downstream side inlet end 22E is opened at such a position as is closed by the primary throttle valve 8d at its closed (i.e., idling) position.

On the other hand, the pipe member 22A comprising the outlet end portion of the sub-suction path 22 has its leading end portion (at the side of the combustion chamber 4) protruding and opened as a reduced diameter injection nozzle 22a into the main suction path 5 immediately upstream of the suction valve 11 and its remaining portion embedded as a boss portion 22b having its larger diameter in the cylinder head 2. As shown in FIGS. 2(A) and 2(B), the length "l" of the injection nozzle 22a is greater than the internal diameter "d" of the leading end thereof. This injection nozzle 22a is slightly bent with respect to the boss portion 22b and is directed generally in the tangential direction of the cylinder 1 so that a swirl of turning gases is seated in the combustion chamber centering around the axis of the cylinder 1. Needless to say, the swirling direction of the gas injected from that injection nozzle 22a is determined such that the gas flows to the exhaust port 10 after it has swept the ignition plug 28 (See FIG. 4). Moreover, the degree of bending is determined, if the axis and external diameter of the generally straight boss portion 22b be designated by capital letters "O" and "D," respectively, such that the radial length "S" between the leading end of the injection nozzle 22a and axis "O" is made not to exceed one half of the external diameter "D" of the boss portion 22b. More specifically, the leading end of the injection nozzle 22a is located in such a circle as is drawn centering around axis "O" to have a radius of ½ D in a plane which extends through the leading end of the injection nozzle 22a and which is normal to axis "O." By bending the injection nozzle 22a to the aforementioned extent, the pipe member 22A can be forced from the joint end face of the cylinder head 2 at the side of the suction manifold 7 into a pipe member insertion hole 2a, which is formed in advance in said cylinder head 2 in accordance with the external diameter of the boss portion 22b, without being obstructed by the injection nozzle 22a.

Incidentally, the exhaust gas is recirculated from the ehaust system via an EGR valve (not shown) into the main suction path 5. Nevertheless, the construction of that portion of the engine of the present invention is similar to that of the prior art, and it is omitted from the drawings.

In the internal combustion engine of the present invention during the suction stroke having the suction valve 11 opened, the combustion chamber 4 is supplied with an air-fuel mixture from the suction path 5, whereas a gas (e.g., air or air-fuel mixture) is injected or sucked from the sub-suction path 22 into the combustion chamber 4. By the injection of the gas from the sub-suction path 22, the mixture sucked into the combustion chamber 4 is swirled turning centering around the axis of the cylinder 1 so that the burning velocity is accelerated.

In the present invention, since the length "l" of the injection nozzle 22a is made larger than its internal diameter "D," the swirl generated is so intensified that the engine can be run at a far higher air-fuel ratio than that of the prior art even if EGR is performed at an identical flow rate. This effect of the present invention is schematically illustrated in FIG. 3 in the driving range corresponding to 40 KM/HR-L. Incidentally, the point indicated at a double circle corresponds to the case, in which the length of the injection nozzle 22a is reduced to zero (i.e., in which the opening diameter of the leading end is merely made small).

The fact that the swirl generated is intensified by making the length "l" of the injection nozzle 22a larger than its internal diameter "d" is considered to result from the fact that a sufficient directivity is imparted to the gas, when this gas flows through the injection nozzle 22a, and is maintained even after the gas leaves the injection nozzle 22a.

On the other hand, the pipe member 22A may be so constructed that the open direction of its downstream end can be adjusted. This embodiment is described below.

Figure 4:
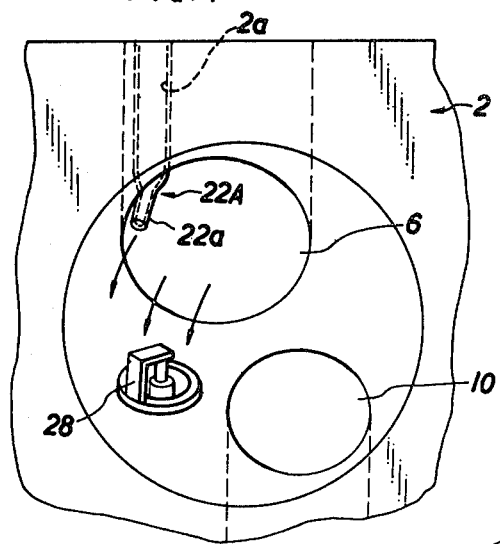
FIG. 4 is a view showing another embodiment of the present invention with a cylinder head being viewed from the inside of the combustion chamber.
Figure 5:
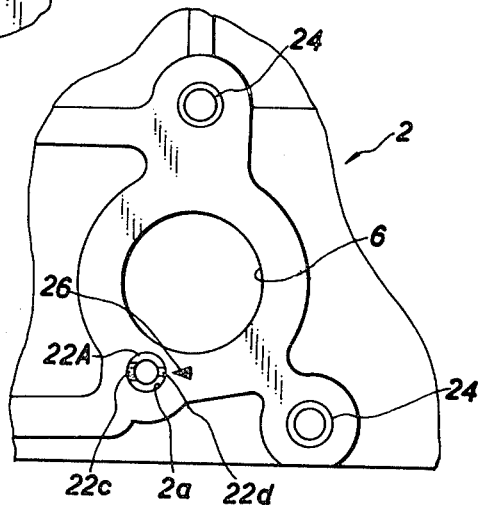
FIG. 5 is a view showing the cylinder head, as taken from the end face of a suction manifold.
Figure 6:
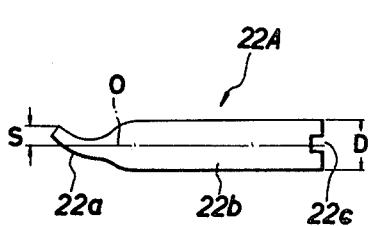
FIG. 6 is a front elevation showing a pipe member.
Figure 7:
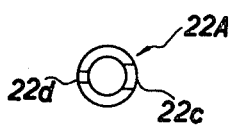
FIG. 7 is a righthand side view of FIG. 6.

The insertion hole 2a has its one end opened into the suction port 6 and its other end opened into the joint end face of the cylinder head 2 to be jointed to the suction manifold 7, as shown in FIGS. 4 and 5. Moreover, the pipe member 22A is formed, as shown in FIGS. 6 and 7, with two recessed portions 22c and 22d at its end face at the outside end face side of the cylinder head 2. Those recessed portions 22c and 22d are formed such that they are arranged oppositely diametrically (180°) on the axis "0" of the boss portion 22b and such that the recessed portion 22c is made circumferentially longer than the recessed portion 22d. Incidentally, reference numeral 24 appearing in FIG. 5 indicates bolt holes for fastening the suction manifold.

Figure 8:
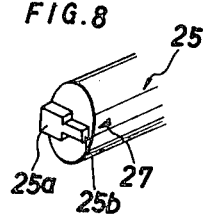
FIGS. 8 and 9 respectively show a perspective view showing one example of a jig to be used when the pipe member is press-fitted.

The pipe member 22A thus constructed is forced, as shown in FIG. 8, for example, into the insertion hole 2a by the use of jig 25. One end face of the jig 25 is provided with two larger and smaller projections 25a and 25b to be fitted in the recessed portions 22c and 22d, such that the injection nozzle 22a is oriented in a predetermined direction. For this purpose, an index 26 is formed on the suction manifold mounting end face of the cylinder head 2 on the circumference of the insertion hole 2a, and an index 27 is also formed on the outer circumference of the jig 25. Then, if the aforementioned forced insertion by the jig 25 is performed with the two indexes 26 and 27 being aligned, thus the pipe member 22A can be assembled without visually confirming the position of the injection nozzle 22a. In this manner, the injection nozzle 22a is oriented in the predetermined direction without fail.

Figure 9:
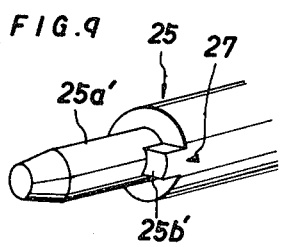

Moreover, as shown in FIG. 9, such a jig may be used that is provided with a projecting guide pin 25a' being coaxial with the jig and a protrusion 25b' positioned at the base portion of the guide pin 25a'. In this case, the pipe member 22A can be rotated circumferentially to be adjusted by inserting the guide pin 25a' into the hole of the pipe member 22A and engaging the protrusion 25b' into the recessed portion 22d provided on the pipe member 22A.

In another embodiment of the present invention, there may be three or more recessed portions. Further, the recessed portions may be replaced with projections. In such a case, the jig 25 is formed with the notches in place of the projection pins 25a and 25b.

Since the engine of the present invention has the described structure, the swirl of the suction air can be so sufficiently intensified that the inflammability limit at the lean combustion side is extended to remarkably contribute to the clarification of the exhaust gas and the improvement in the rate of fuel consumption.

Moreover, since the present invention has been conceived by elaborately investigating the influences of the shape and size of the downstream end portion of the sub-suction path upon the intensity of the swirl of the suction air such that said downstream end is constituted as a reduced diameter injection nozzle in a manner to make the length of the injection nozzle portion, i.e., the reduced diameter portion larger than the internal diameter of the injection nozzle, the flow resistance of the whole sub-suction path can be sufficiently reduced, and the flow velocity of the gas to be injected from the sub-suction path is increased with a resultant increase in the swirl of the suction air.

Moreover, since the outlet end portion of the sub-suction path is constructed of the pipe member press-fitted into the cylinder head, it can be oriented in a predetermined direction by the remarkably simple operation of forcing the pipe member, which has been formed in advance into a predetermined shape, into the cylinder head. Furthermore, since the end face of the aforementioned pipe member at the side of the outside end face of the cylinder head is formed with recessed portions or projections, the forced insertion can be performed by the use of the jig. This jig is formed with projections or recessed portions to be fitted in the recessed portions or the projections of the pipe member, without any rotational displacement with respect to the insertion hole in the cylinder head.

What is claimed is:

1. An internal combustion engine comprising:
a combustion chamber defined by a cylinder, a cylinder head, and a piston fitted in said cylinder;
a main suction path connecting a carburetor with said combustion chamber via a suction port which is formed in said cylinder head, said combustion chamber having a side and said suction port having an end portion located at said side of said combustion chamber, said suction port being adapted to be opened and closed by a suction valve which is disposed in said end portion of said suction port at said side of said combustion chamber; and
a sub-suction path provided separately of said main suction path and having its outlet end opened into said suction port immediatley upstream of said suction valve for injecting a gas into said combustion chamber during the suction stroke thereby to generate a swirl of the suction gas to turn centering around the axis of said cylinder;
the internal combustion engine characterized in that the outlet end portion of said sub-suction path is constructed of a pipe member, said pipe member having a first outlet end which is open and directed toward said suction port and a second end portion opposite said first outlet end, said cylinder head further having an outside end face with a side therein, said pipe member being rotatably press-fitted in an insertion hole in said cylinder head and being opened in both said suction port and said outside end face of said cylinder head and which is so shaped that said open direction of said first outlet end of said pipe member can be changed when it is rotated for adjustment, and in that a rotationally operating portion for said pipe member is formed in said second end portion of said pipe member at said side of said outside end face of said cylinder head.

2. An internal combustion engine of claim 1, wherein said rotationally operating portion is at least one recessed portion which is formed in said second end portion of said pipe member.

3. An internal combustion engine of claim 2, wherein two recessed portions are provided in said second end portion of said pipe member wherein one has a different shape and size than the other.

4. An internal combustion engine of claim 1, wherein said rotationally operating portion is a protrusion which is formed on said second end portion of said pipe member.

5. An internal combustion engine of claim 4, wherein at least two of said protrusions are so provided that one of them has a different shape and size than the other.

6. An internal combustion engine of claim 1 wherein said first outlet end of said pipe member has a reduced diameter and constitutes an injection nozzle, and wherein the length of said injection nozzle is made equal to or greater than its internal diameter.

7. An internal combustion engine of claim 6, wherein said pipe member has a boss portion and said injection nozzle has a leading end, said injection nozzle of said pipe member being slightly bent toward said combustion chamber so as to generate the swirl in said combustion chamber, and wherein the radial length between the axis of said boss portion of said pipe member, which is embedded in said cylinder head, and said leading end of said bent injection nozzle is made equal to or smaller than the external diameter of said boss portion.

* * * * *